United States Patent [19]

Minnick et al.

[11] 3,921,155

[45] Nov. 18, 1975

[54] MAGNETIC BUBBLE TRANSMISSION CIRCUIT

[75] Inventors: Robert C. Minnick, Houston, Tex.; Paul T. Bailey, Creve Coeur; Robert M. Sandfort, St. Charles, both of Mo.

[73] Assignee: Monsanto Company, St. Louis, Mo.

[22] Filed: Feb. 23, 1973

[21] Appl. No.: 335,303

[52] U.S. Cl. .................... 340/174 TF; 340/174 SR
[51] Int. Cl.$^2$ .................. G11C 11/14; G11C 19/08
[58] Field of Search ............... 340/174 SR, 174 TF; 307/88 LC

[56] References Cited

UNITED STATES PATENTS

| | | | |
|---|---|---|---|
| 3,503,054 | 3/1970 | Bobeck et al. | 340/174 TF |
| 3,516,077 | 6/1970 | Bobeck et al. | 340/174 TF |
| 3,540,019 | 11/1970 | Bobeck et al. | 340/174 TF |
| 3,644,908 | 2/1972 | Bobeck | 340/174 TF |
| 3,676,872 | 7/1972 | Lock | 340/174 TF |
| 3,699,548 | 10/1972 | Copeland | 340/174 TF |
| 3,701,129 | 10/1972 | Copeland | 340/174 TF |
| 3,735,145 | 5/1973 | Heinz | 340/174 TF |
| 3,811,110 | 5/1974 | Inose et al. | 340/174 TF |

OTHER PUBLICATIONS

IBM Tech. Disc. Bull., "Using Bubble Lattice Wave Motion as a Shifting Mechanism", by Bogholtz et al., Vol. 13, No. 9, 2/71, p. 2738.

IBM Tech. Disc. Bull., "Passive Magnetic Domain Amplification", by Bosch et al., Vol. 13, No. 9, 2/71, p. 2739.

*Primary Examiner*—Stanley M. Urynowicz, Jr.
*Attorney, Agent, or Firm*—Lane, Aitken, Dunner & Ziems

[57] ABSTRACT

A pair of elongated magnetic boundaries on a magnetic bubble chip define a path which contains a plurality of bubbles movable in the direction of the path. The rail-like magnetic boundaries have the same polarity as the bubbles. When the path is full of bubbles, the introduction of a single bubble or other magnetic impulse at one end of the path instantaneously causes the ejection of another bubble at the opposite end of the path due to bubble-bubble interaction. In one embodiment the magnetic boundaries are formed by permalloy rails on which strip domains form. In another embodiment, lines of permalloy dots form "fence posts" for fixed fence bubbles. The same technique is applied to implement an instantaneous cross-over of two bubble tracks. In addition, the magnetic boundaries can be used to bias the confined bubbles thus influencing their size.

36 Claims, 5 Drawing Figures

MAGNETIC BUBBLE TRANSMISSION CIRCUIT

BACKGROUND OF THE INVENTION

The invention relates generally to the field of magnetic bubble technology (MBT) and more particularly to means for propagating or transmitting magnetic bubbles.

Briefly, MBT involves the creation and propagation of magnetic bubbles in specially prepared magnetic materials. The word "bubble" used throughout this text is intended to encompass any single-walled magnetic domain, defined as a domain having an outer boundary which closes on itself. The application of a static, uniform magnetic bias field orthogonal to a sheet of magnetic material having suitable uniaxial anisotropy causes the normally random serpentine pattern of magnetic domains to shrink into short cylindrical configurations or bubbles whose common polarity is opposite that of a bias field. The bubbles repel each other and can be moved or propagated by a magnetic field in the plane of the sheet.

Many schemes now exist for propagating bubbles along predetermined channels. One system includes permalloy circuit elements shaped like military service stripes or "chevrons" spaced end-to-end in a thin layer over the sheet of magnetic material. The drive field is continuously rotating in the plane of the sheet causing each chevron to act as a small magnet whose poles are constantly changing. As the drive field rotates, a bubble under one of the chevrons is moved along the chevron channel from point-to-point in accordance with its magnetic attraction to the nearest attracting temporary pole of the circuit elements. This system is among those referred to as "field-across" as distinguished from other systems employing sequentially pulsed loops of electrical conductors disposed in series over the magnetic sheet.

MBT can be used in data processing because magnetic bubbles can be propagated through their channels at a precisely determined rate so that uniform data streams of bubbles are possible in which the presence or absence of a bubble indicates a binary 1 or 0. The use of MBT for performing logic operations is based on the fact that close magnetic bubbles tend to repel each other. Thus, if alternate paths with varying degrees of preference are built into the chevron circuit, the direction which a bubble in one channel ultimately takes may be influenced by the presence of absence of a bubble on another closely spaced channel. Logic systems capitalizing on this principle are discussed in the article by R. C. Minnick et al, entitled "Magnetic Bubble Logic," in the published Proceedings of the Sept. 19, 1972, Wescon Conference, and in U.S. Pat. application Ser. No. 283,267, filed Aug. 24, 1972, by Minnick et al entitled "Magnetic Bubble Logic Family."

One of the problems remaining in implementing bubble data processing systems is attaining realistic operating speeds despite the relatively slow propagation of bubbles through conventional bubble circuits compared to electrical signals in wire.

A bubble compressor has been shown before in an article entitled "Applications of Bubble Devices" by Bonyhard et al in IEEE Transactions on Magnetics, vol. MAG-6, No. 3, page 450, Sept. 1970. The compressor circuit is constructed of a string of idler circuits each having four stable states for a bubble in each cycle of drive field rotation. Thus, this compressor is built of circuit elements under the control of the drive field. Each idler section contains a bubble, and when a bubble is presented at the input of the idler string, a chain reaction takes place along the whole compressor. Bubbles in all of the idlers move in the direction of the output, resulting in the spill-over of the last bubble within one cycle of rotation. The absence of an input bubble leaves the content of the compressor unchanged.

SUMMARY OF THE INVENTION

The general purpose of the invention is to improve upon the prior art compressor circuit by achieving instantaneous transmission in the absence of drive field-controlled circuit elements.

The applicants have discovered a technique of confining bubbles in an area called a bubble "corral." The corral is defined by magnetic boundaries which have the same polarity as the individual bubbles and therefore repel the bubbles from the boundaries. For example, in one embodiment the corral takes the form of an elongated path termed a "bubble wire" because of its electron-like speed and spill-over operation. Two thin parallel rails of ferromagnetic material having low reluctance with low retentivity, such as permalloy, are disposed on a magnetic bubble chip, for example, of the familiar garnet composition. Elongated magnetic domains, called "strip domains," form on the rails thus completing the magnetic boundaries for the bubble wire. Alternatively, rails which define the transmission path may be formed by parallel lines of spaced, magnetic dots which form "fence posts" for stationary "fence" bubbles. The path between the magnetic boundaries may be filled with bubbles such that an input bubble or other magnetic impulse at one end of the path causes the instantaneous output of a bubble at the opposite end. The bubbles in the path are free to move in a direction parallel to the magnetic boundaries but are kept approximately centered between the boundaries because of the repelling polarity of the boundaries.

In another embodiment, four L-shaped rails are arranged to form an intersection of two approximately orthogonal bubble wires. One bubble in each bubble wire is common to both.

In another embodiment the distance between the rails of the bubble wire is varied in order to vary the bias on bubbles contained between the rails and thus to alter their size.

DESCRIPTION OF THE PREFERRED EMBODIMENTS

Figure 1:
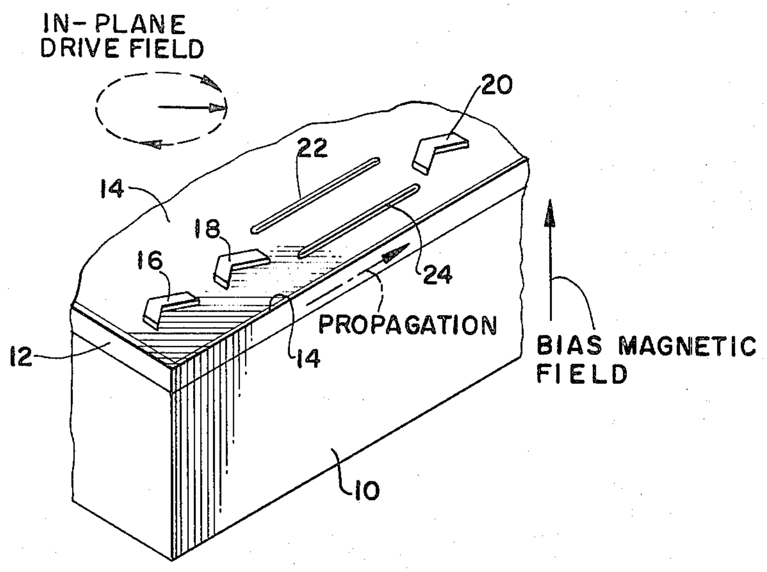
FIG. 1 is a fragmentary perspective view of a bubble chip having a transmission circuit formed by magnetic rails according to the invention.

FIG. 1 illustrates the basic components of a field-accessed garnet bubble clip having a bubble wire circuit according to the invention. A substrate 10 of non-magnetic garnet supports an epitaxial magnetic bubble garnet layer 12 and a spacing layer 14 of silicon oxide, $SiO_2$, to which conventional permalloy chevron circuit elements 16, 18 and 20 are bonded. The chip is subjected to a magnetic bias field orthogonal to the plane of the bubble garnet layer 12. In the presence of a bias field of suitable strength, cylindrical magnetic bubbles (not shown in FIG. 1) are maintained in the bubble garnet layer 12. A rotating, in-plane magnet drive field causes bubbles to propagate, for example, from chevron circuit element 16 to element 18. A pair of straight, parallel permalloy rails 22 and 24 are bonded to the spacing layer 14 between the chevrons 18 and 20. The rails 22 and 24 may be any desired length, the length shown in FIG. 1 being chosen for convenience of illustration only.

Figure 2:
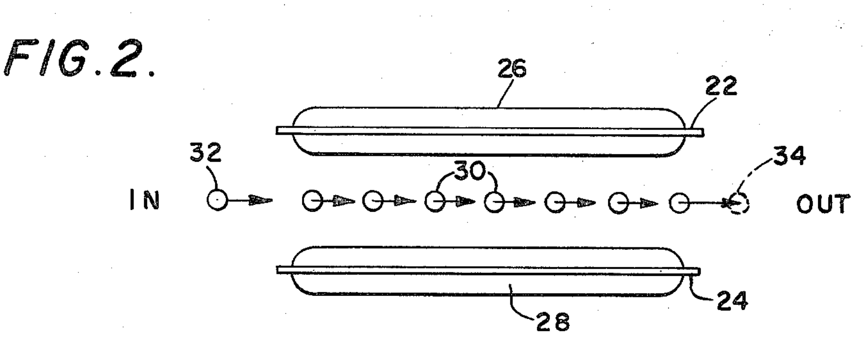
FIG. 2 is a schematic drawing of the bubble wire circuit of FIG. 1 filled with bubbles.

The operation of the bubble wire formed by the rails 22 and 24 is shown schematically in FIG. 2. Magnetic strip domains 26 and 28 form along the rails 22 and 24 respectively. When the path between the strip domains 26 and 28 is filled with magnetic bubbles 30, the bubbles 30 will remain spaced from each other in a line between the strip domains 26 and 28. The rotating drive field has no effect on the bubbles 30 because there are no circuit elements in the path between the rails 22 and 24. When an input bubble 32, or other magnetic impulse, is introduced at one end of the path between the rails 22 and 24, the bubble-bubble interaction is transferred through the bubbles 30, as in a chain reaction, resulting in the expulsion of an output bubble 34 practically instantaneously. The effect is somewhat analogous to that of a cue ball colliding head on with the end of a line of contiguous pool balls whereby only the pool ball on the opposite end is ejected from the line. With reference to FIG. 1, the input bubble 32 would come from the chevron 18 and the output bubble 34 would go to the chevron 20. Thus, in operation the circuit shown in FIG. 1 would perform the same as if chevrons 18 and 20 were actually adjacent like chevrons 16 and 18. Hence the rails 22 and 24 serve to compress the distance between chevrons 18 and 20.

Figure 3:
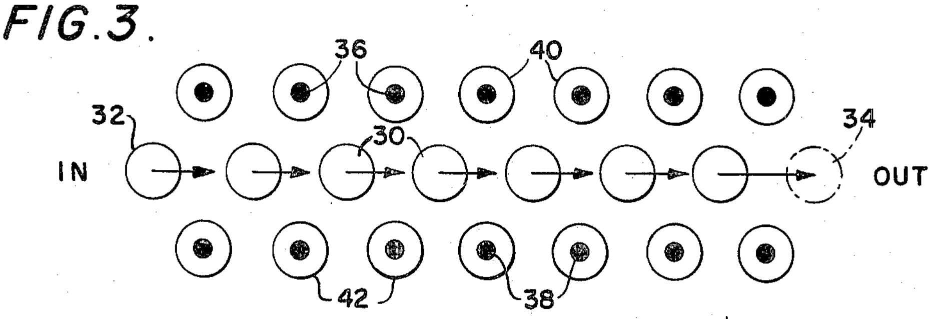
FIG. 3 is a schematic drawing of a bubble wire in which the boundaries are formed by lines of spaced magnetic dots.

An alternative embodiment is shown in FIG. 3. In place of the rails 22 and 24, corresponding lines of equally spaced permalloy dots 36 and 38 are arranged approximately in parallel. Instead of strip domains, cylindrical domains or bubbles 40 and 42 form around the permalloy dots 36 and 38 respectively. By analogy the dots 36 and 38 are termed fence posts. The bubbles 40 and 42 act as a fence containing the line of bubbles 30. The operation of the circuit of FIG. 3 is similar to that of FIG. 1. In addition, if the dots 36 and 38 are aligned or located at corresponding positions in each magnetic boundary as shown in FIG. 3, the bubbles 30 will tend to reside in stable positions between the corresponding dot locations because the bubbles seek energy minima. Thus each bubble will tend to locate itself automatically between four bubbles, that is, two bubbles 40 and two bubbles 42. When an input bubble 32 is introduced at the input end of the bubble wire, all of the bubbles will advance (rightward as viewed in FIG. 3) to the next stable position and the last bubble will be expelled at the output bubble 34. While the strip domain embodiment shown in FIGS. 1 and 2 operates satisfactorily, the stable energy minimizing positions provided by the fence bubble embodiment of FIG. 3 even further enhances the operating characteristics of the bubble wire. In particular, the bubbles do not tend to wander out of the ends of the corral but remain in their stable energy minimizing positions. On the other hand, the strip domain arrangement of FIG. 1 and 2 has the advantage of providing a tighter boundary with less chance of inadvertent escape of a bubble through the boundary. Any tendency of bubbles to wander out of the ends of the corral defined by strip domain can be counteracted by slightly crimping the ends of the rails and thereby the strip domains formed on the rails. The ends of the strip domain would then exert a slight repelling effect on bubbles in the corral and prevent any bubbles from wandering out of the ends of the corral.

Figure 4:
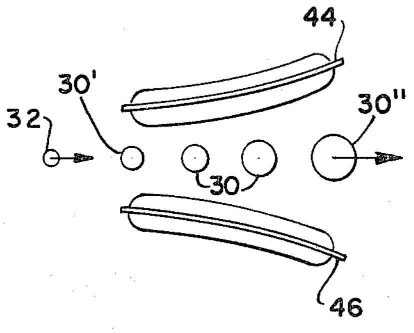
FIG. 4 is a strip domain bubble wire in which the spacing between the rails increases towards one end.

Because the strip domains or fence bubbles exert a magnetic influence on the contained bubbles 30, they also may act as an auxiliary, localized bias field. This localized field can be manipulated to alter the size of the contained bubbles. One way in which this can be accomplished is shown in FIG. 4, in which the permalloy rails 44 and 46 do not remain parallel, but have instead a gradually increasing spacing toward one end. Thus, a bubble 30' located near the narrow end of the bubble wire is somewhat smaller than a bubble 30'' located at the larger flared end of the bubble wire.

Figure 5:
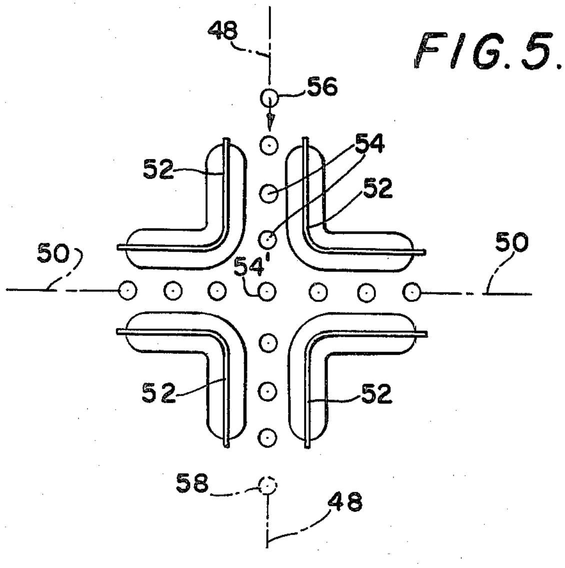
FIG. 5 is a schematic diagram of a bubble cross-over circuit employing a pair of intersecting bubble wires.

In FIG. 5 a crossover circuit with intersecting bubble wires permits instantaneous crossing of one bubble path 48 by bubbles on an orthogonal bubble path 50, and vice versa. Four L-shaped permalloy rails 52 with corresponding strip domains are arranged in the form of a cross to provide two crossed paths containing bubbles 54. One of these contained bubbles 54' located at the center of the cross is shared by the two bubble paths 48 and 50. A bubble 56 on path 48 entering the crossover circuit will cause the instantaneous expulsion of a bubble 58 downstream of the crossover circuit on the path 48. Bubbles on the track 50 are similarly transmitted through the crossover circuit.

In the special applications indicated in FIGS. 4 and 5 the fence post bubble technique illustrated in FIG. 3 may be used instead of the rails with strip domains.

The utility and advantages of the circuits disclosed above should be evident. Those skilled in the art have already recognized the need for increasing the speed of propagation of magnetic bubbles and the bubble wire circuits illustrated above achieve practically instantaneous transmission over long distances. Moreover, the circuits are not dependent on circuit elements and are therefore compatible with any type of regular propagation circuit such as chevrons, T-bars or conductive loop systems.

The invention may be embodied in other specific forms without departing from its spirit or central characteristics. The present embodiments are therefore to be considered in all respects as illustrative and not restrictive, the scope of the invention being indicated by the claims rather than by the foregoing description, and all changes which come within the meaning and range of the equivalence of the claims are therefore intended to be embraced therein.

We claim:

1. A magnetic bubble transmission circuit, comprising magnetic boundary means for confining a plurality of adjacent magnetic bubbles in a line including two spaced lines of spaced dots of ferromagnetic material and stationary bubbles formed about said dots respectively to form said boundary means, means for generating a magnetic impulse at one end of said line of bubbles and means for receiving a line bubble ejected from the other end of said line of bubbles in response to said impulse.

2. A magnetic bubble transmission circuit comprising a sheet of magnetic bubble material, magnetic boundary means disposed on said sheet for confining a plurality of closely adjacent magnetic bubbles in a line such that movement of one bubble in the line causes like movement of the next adjacent bubble by bubble-bubble interaction, means for generating a magnetic impulse at one end of said line of bubbles to initiate said interaction, means for receiving a bubble ejected from the other end of said line of bubbles in response to the bubble-bubble chain reaction initiated by said impulse, said magnetic boundary means including means for generating magnetic fields repulsive to said magnetic bubbles along two spaced lines between which said magnetic bubbles are constrained, and means for generating a reorienting magnetic drive field in the plane of said sheet, said boundary means being arranged such that the advancement of bubbles in said line is unaffected by said drive field.

3. Magnetic bubble apparatus, comprising a sheet of magnetic bubble material, means for producing and maintaining bubbles therein, magnetic single wall domain means within said sheet defining a stationary magnetic boundary within said sheet for containing bubbles in a bounded area of said sheet.

4. A magnetic bubble crossover circuit, comprising a plurality of magnetic boundaries arranged to define therebetween two crossed paths for a plurality of magnetic bubbles, means for generating a magnetic impulse at one end of each of said paths and means for receiving a bubble ejected in response to said impulse at the corresponding other end of each of said paths, said magnetic boundaries including four L-shaped magnetic boundaries arranged symmetrically about the intersection of said paths to constrain said plurality of bubbles within said two crossed paths.

5. A magnetic bubble crossover circuit, comprising a plurality of magnetic boundaries arranged to define therebetween two crossed paths for a plurality of magnetic bubbles, the portions into which each said path is divided by intersection of the other said path being in alignment at the intersection of said paths, said magnetic boundaries include means for generating repulsive magnetic fields to confine said plurality of magnetic bubbles to said two crossed paths, means for generating a magnetic impulse at one end of each of said paths and means for receiving a bubble ejected in response to said impulse at the corresponding other end of each of said paths.

6. A magnetic bubble crossover circuit comprising a plurality of magnetic boundaries arranged to define therebetween two crossed paths for a plurality of magnetic bubbles, the portions into which each said path is divided by intersection of the other said path being in alignment at the intersection of said paths, said magnetic boundaries include means for holding elongated strip domains in the same plane as said plurality of magnetic bubbles in a pattern to define said two crossed paths, means for generating a magnetic impulse at one end of each of said paths and means for receiving a bubble ejected in response to said impulse at the corresponding other end of each of said paths.

7. A magnetic bubble crossover circuit, comprising of plurality of magnetic boundaries arranged to define therebetween two crossed paths for a plurality of magnetic bubbles, the portions into which each said path is divided by intersection of the other said path being in alignment at the intersection of said paths, said magnetic boundaries include means for holding a plurality of boundary bubbles in the same plane as said plurality of bubbles on said paths in a pattern to define said two crossed paths, means for generating a magnetic impulse at one end of said of said paths and means for receiving a bubble ejected in response to said impulse at the corresponding other end of each of said paths.

8. A magnetic bubble transmission circuit comprising magnetic boundary means for confining a plurality of adjacent magnetic bubbles in a line including means for generating magnetic fields repulsive to said magnetic bubbles along two lines of varying spacing between which said magnetic bubbles are constrained, the path defined between said lines being narrower at one end such that said constrained bubbles are smaller at said one end, means for generating a magnetic impulse at one end of said line of bubbles, and means for receiving a bubble ejected from the other end of said line of bubbles in response to said impulse.

9. A magnetic bubble transmission circuit, comprising a sheet of magnetic bubble material, repulsive magnetic boundary means disposed on said sheet for confining a plurality of closely adjacent magnetic bubbles in a line such that movement of one bubble in the line causes like movement of the next adjacent bubble by bubble-bubble interaction, means for generating a magnetic impulse at one end of said line of bubbles to initiate said interaction, and means for receiving a bubble ejected from the other end of said line of bubbles in response to the bubble-bubble chain reaction initiated by said impulse.

10. The transmission circuit of claim 9, wherein said means for generating an impulse includes a bubble propagation circuit for advancing an input bubble toward said one end of said line.

11. The transmission circuit of claim 9, wherein said receiving means includes a bubble propagation circuit for receiving and carrying away said ejected bubble.

12. A magnetic bubble crossover circuit, comprising a sheet of magnetic bubble material, means for producing and maintaining bubbles therein, a pair of intersecting magnetic bubble channels each passing through and beyond the other and each formed by means for holding a plurality of magnetic boundary bubbles in spaced relationship in two spaced lines for confining a plurality of magnetic bubbles in said sheet between said spaced lines, means for generating a magnetic impulse at one end of each of said channels and means for receiving a bubble ejected in response to said impulse at the corresponding other end of each of said channels.

13. The crossover circuit of claim 12, wherein said holding means is for holding said bubble in equally spaced relationship in each line.

14. The crossover circuit of claim 12, wherein said holding means includes a plurality of spaced dots of soft ferromagnetic material arranged on said sheet in two spaced lines, individual ones of said boundary bubbles residing under corresponding ones of said spaced dots, said two lines of dots together defining a corresponding one of said two channels.

15. Magnetic bubble apparatus, comprising a sheet of magnetic bubble material, means for producing and maintaining bubbles therein, magnetic domain means defining a stationary magnetic boundary within said sheet for containing bubbles in a bounded area of said sheet, said means for defining a boundary including a ferromagnetic overlay pattern disposed on said sheet defining said bounded area and means for forming magnetic boundary domains at corresponding locations in said sheet beneath said overlay pattern, said pattern providing stationary positions for said boundary domains, whereby said boundary domains collectively exert a static repulsive force to contain said bubbles within said bounded area.

16. The apparatus of claim 15, wherein said overlay pattern includes elongated rails of soft ferromagnetic material, said magnetic boundary domains taking the form of strip domains beneath said elongated rails respectively.

17. The apparatus of claim 15, further comprising means for generating a reorienting magnetic drive field in the plane of said sheet, said overlay pattern being arranged to maintain said stationary positions for said boundary domains in the presence of said reorienting drive field.

18. The apparatus of claim 15, wherein said ferromagnetic overlay pattern includes a plurality of spaced dots of soft ferromagnetic material, said magnetic domains taking the form of individual bubbles residing beneath corresponding ones of said spaced dots.

19. A magnetic bubble transmission circuit, comprising magnetic boundary means for confining a plurality of adjacent magnetic bubbles in a line including two spaced elongated rails of ferromagnetic material and stationary strip domains formed on said rails respectively to form said boundary means, means for generating a magnetic impulse at one end of said line of bubbles, and means for receiving a line bubble ejected from the other end of said line of bubbles in response to said impulse.

20. The circuit of claim 19, wherein said ferromagnetic material is a soft ferromagnetic material.

21. The circuit of claim 19, wherein said magnetic boundary means is for confining a plurality of adjacent magnetic bubble in a line in the same plane as said strip domains formed along said rails.

22. The circuit of claim 19, wherein said strip domain forming means is for forming one strip domain along one of said rails and another strip domain along the other of said rails such that said plurality of adjacent magnetic bubbles is confined in a line between said strip domains.

23. A magnetic bubble cross-over circuit, comprising two intersecting bubble channels each passing through and beyond the other so as to provide a crossing of said channels, each of said channels including means for maintaining a string of transmission bubbles including a two-sided arrangement of stationary single wall domains having collectively a geometry such that magnetically repulsive force is applied in a predetermined repetititve pattern from both sides of said string to restrain said transmission bubbles in said string to a linear path alternating between high and low levels of magnetic repulsion along said path so as to define relatively stable spaced positions for said transmission bubbles along said linear path at locations corresponding to said low levels of magnetic repulsion, means for generating a magnetic impulse at one end of said string of tranmission bubbles, and means for receiving a transmission bubble ejected from the other end of said string of transmission bubbles in response to said impulse.

24. The crossover circuit of claim 23, wherein the separation between said locations corresponding to said low levels is predetermined such that a magnetic impulse applied to one end of said string is transmitted by means of a bubble-bubble chain reaction through said string to the other end of said string.

25. A magnetic bubble transmission circuit comprising means for maintaining a string of transmission bubbles including a two-sided arrangement of stationary single wall domains having collectively a geometry such that magnetically respulsive force is applied in a predetermined repetitive pattern from both sides of said string to restrain said transmission bubbles in said string to a linear path alternating between high and low levels of magnetic repulsion along said path so as to define relatively stable spaced positions for said transmission bubbles along said linear path at locations corresponding to said low levels of magnetic repulsion, means for generating a magnetic impulse at one end of said string of transmission bubbles, and means for receiving a transmission bubble ejected from the other end of said string of transmission bubbles in response to said impulse.

26. The transmission circuit of claim 25, wherein the separation between said locations corresponding to said low levels is predetermined such that a magnetic impulse applied to one end of said string is transmitted by means of a bubble-bubble chain reaction through said string to the other end of said string.

27. A magnetic bubble transmission circuit, comprising magnetic boundary means for confining a plurality of adjacent magnetic bubbles in a line including means for generating magnetic fields of uniform polarity parallel to the polarity of said bubbles and repulsive thereto along two spaced lines between which said magnetic bubbles are constrained, means for generating a magnetic a magnetic impulse at one end of said line of bubbles, and means for receiving a bubble ejected from the other end of said line of bubbles in response to said impulse.

28. The circuit of claim 27, wherein said field generating means includes highly permeable ferromagnetic overlay material arranged along said two spaced lines, and means for forming domains directly beneath said ferromagnetic overlay material, said domains collectively forming repulsive magnetic boundary for bubbles between said lines.

29. The transmission circuit of claim 27, wherein said lines are of varying spacing.

30. The transmission circuit of claim 27, wherein said lines are approximately parallel.

31. The circuit of claim 27, wherein said means for generating repulsive magnetic fields includes means for holding two elongated strip domains in stationary positions along said two spaced lines respectively.

32. The circuit of claim 31, wherein said holding means includes two spaced elongated rails of soft ferromagnetic material arranged along said two spaced lines respectively.

33. The circuit of claim 27, wherein said means for generating repulsive magnetic fields includes means for holding a plurality of boundary bubbles in spaced relationship along each of said two spaced lines.

34. The circuit of claim 33, wherein said two spaced lines are approximately parallel, said boundary bubbles being equally spaced in both of said spaced lines and corresponding bubbles in each line being opposite from the bubbles in the other line.

35. The circuit of claim 33, wherein said holding means includes a plurality of dots of soft ferromagnetic material in spaced relationship along each of said two spaced lines.

36. The circuit of claim 35, wherein said dots and said bubbles held thereby are equally spaced in both of said spaced lines, said lines of dots being approximately parallel and corresponding dots in each line being opposite from the dots in the other line.

* * * * *